July 16, 1929.  C. F. DAVY  1,720,823
FIRE ESCAPE
Filed Jan. 11, 1927  2 Sheets-Sheet 1
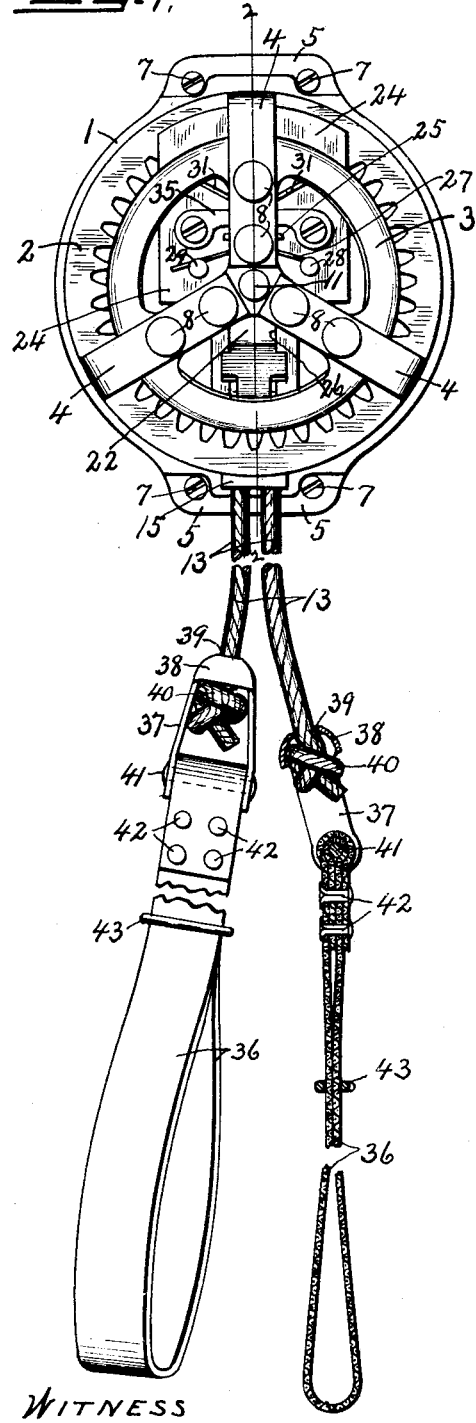
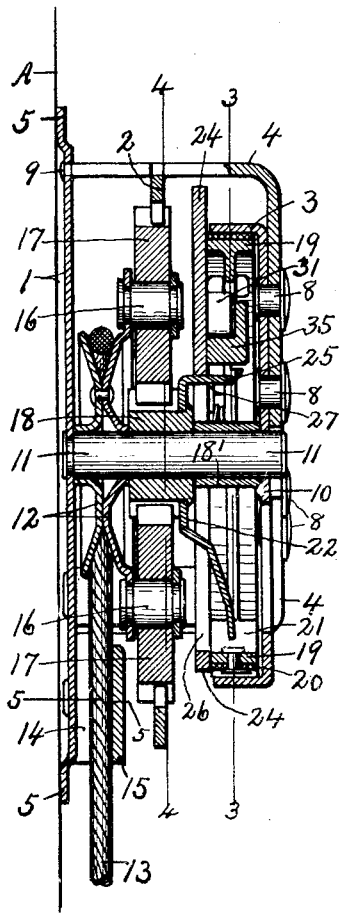
INVENTOR
C. F. Davy
BY Denison + Thompson
ATTORNEYS.

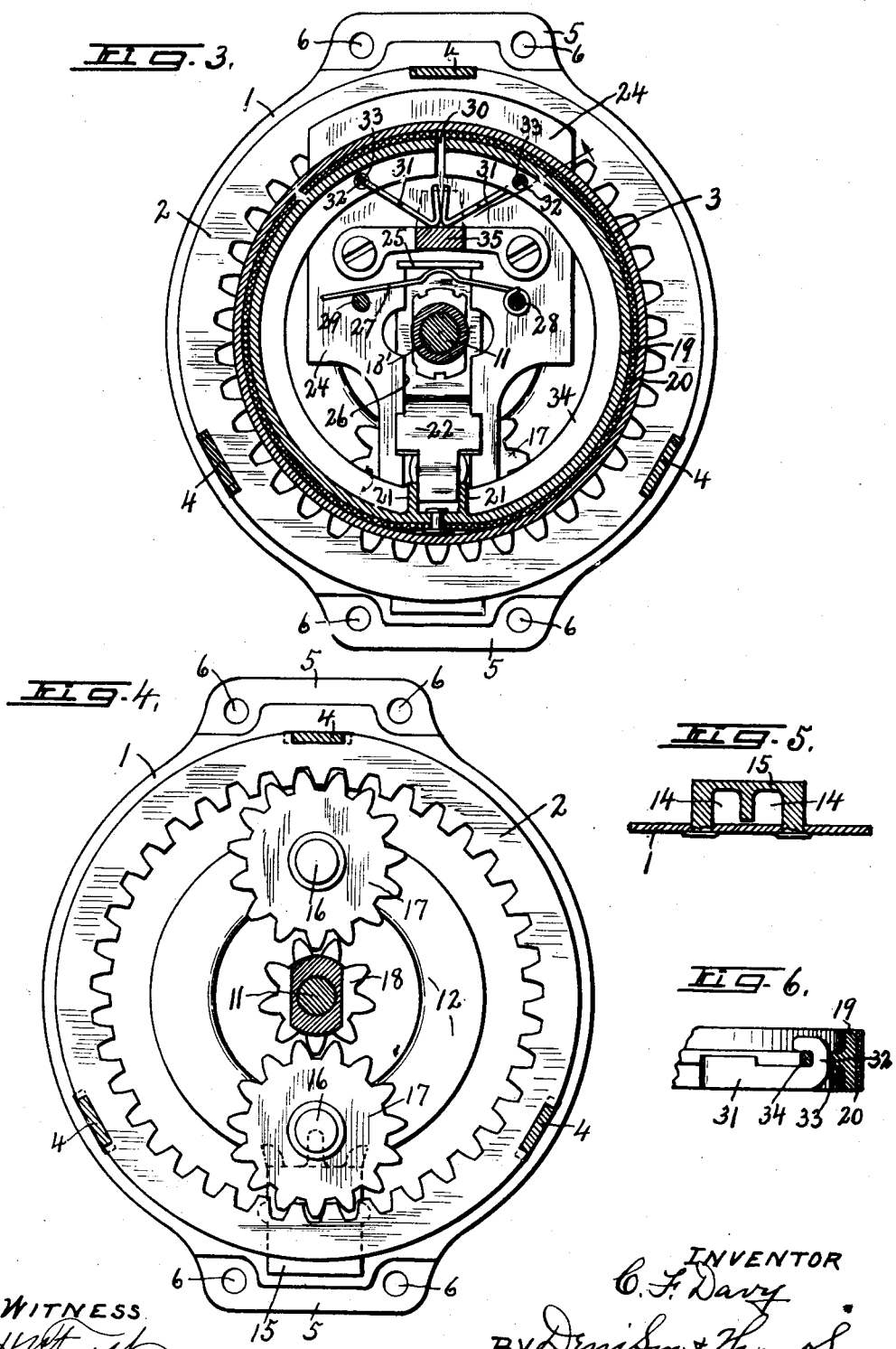

Patented July 16, 1929.

1,720,823

UNITED STATES PATENT OFFICE.

CHARLES F. DAVY, OF SYRACUSE, NEW YORK.

FIRE ESCAPE.

Application filed January 11, 1927. Serial No. 160,374.

This invention relates to a fire escape of the centrifugal brake type in which a supporting frame carrying a relatively stationary brake drum is adapted to be firmly secured to the side walls or other available supporting means in the upper stories of hotels and other buildings for the reception of the centrifugally operated brake member or members and operating means therefor whereby the occupants of the building may be lowered to places of safety without injury.

These devices are usually provided with a grooved pulley and a cable passing around the pulley so as to frictionally engage the periphery thereof and of sufficient length to extend from the supporting frame to the ground or other place of safety, both ends of the cable being usable and provided with suitable loops adapted to be passed around the body under the arms to assure their safe descent, and one of the specific objects of the invention is to provide a more secure means of attachment of the ends of the cables to the body loops.

In devices of this character a split brake drum is operatively connected to and rotated by means of the pulley or cable-supporting sheave and carries a weighted member which is slidable radially thereon by centrifugal force against the action of a comparatively light retracting spring for expanding the brake ring against the brake drum through the medium of a suitable toggle.

Heretofore the toggle members have been attached to the brake ring at opposite sides of the division by means of pivotal studs passed through registering openings in the brake ring and adjacent ends of the toggle which are necessarily of relatively small size and require the drilling of holes therein to receive the pivotal studs thereby weakening the adjacent ends of the toggle members in addition to the extra work of drilling the holes therein and the extra cost of the construction and assembling of the studs and the more or less uncertainty of free turning movement of the pivotal connections.

One of the objects of the present invention is to obviate the objections referred to by forming the toggle members with integral hook-shaped extremities adapted to enter apertures in the brake ring thereby assuring more reliable connections between the toggle members and ring and at the same time greatly expediting the work of assembling those parts in operative position.

Another object is to bring the center of the retracting spring into contact with one of the rotating parts connecting the pinion with the brake ring and thereby to avoid contact between the spring and a relatively stationary shaft and to that extent reducing the resistance to the free rotation of the brake ring and sliding weight carried thereby.

Another object is to form the back plate in such manner that the portions thereof which are secured to the wall or other flat surface may project rearwardly slightly beyond the remaining portions of the plate so as to lie flatwise against the wall or other supporting surface thus permitting the rivet heads and rear end of the shaft to lie wholly within the plane of the bearing surfaces of the back plate against the wall, all of which contributes to the safety of securement of the device to the wall.

Other objects and uses relating to specific parts of the device will be brought out in the following description.

In the drawings:—

Figure 1 is a front face view of a fire escape showing the cables and loops attached thereto except that portions of the cables are broken away.

Figure 2 is an enlarged vertical sectional view taken on line 2—2, Figure 1.

Figures 3 and 4 are sectional views taken in the planes of lines 3—3 and 4—4 respectively, Figure 2.

Figure 5 is an enlarged detail sectional view taken on the plane of line 5—5, Figure 2.

Figure 6 is a detail sectional view through a portion of the brake ring showing one of the thrust members for expanding the same.

As illustrated, the frame of this machine comprises a back plate —1—, an intermediate gear ring —2— and a brake drum —3— arranged in co-axial axially spaced relation about a common axis and held in such relation by a plurality of, in this instance three, L-shaped yoke arms —4—.

The back plate —1— is mainly circular but is provided at diametrically opposite sides with radially projecting extensions —5— forming what may be regarded as the top and bottom of the frame, said extensions being offset rearwardly beyond the remaining portions of the plate to lie flatwise against a wall or other flat supporting surface and are provided with apertures —6— for receiving suitable screws —7— by which the back plate is secured to the wall surface —A—.

The object in offsetting the extensions —6— rearwardly is to permit other parts of the device to be riveted or otherwise secured to the back plate wholly within the vertical plane of the rear faces of the extensions —5—.

The yoke arms —4— are arranged in uniformly spaced relation circumferentially around the axis of the plate —1— and drum so as to extend radially from said axis and are substantially rectangular or L-shaped in side elevation.

The front ends of the yoke arms extend inwardly toward the axis and across the front face of the brake drum —3— and are permanently secured thereto by rivets —8— to hold the drum against relative rotation.

The outer portions of the yoke arms —4— are substantially parallel with the axis of the drum —3— and are riveted or otherwise secured at —9— to the back plate —1— to hold those parts in fixed relation, said outer arms being arranged some distance beyond the periphery of the drum —3— and also beyond all of the rotating parts to partially protect the same from contact with external objects.

The periphery of the gear ring —2— is provided with notches for receiving the peripheral arms of the yoke members which are also notched to receive the opposite walls of the notches in the gear ring for holding the gear ring against rotation and also in axially spaced relation to the back plate —1— and brake drum —3—.

The brake drum —3— is cylindrical and provided with a plurality of, in this instance three, radial supporting arms registering with the radial arms of the yoke members —4— to which they are secured by the rivets —8—, said radial arms of the brake drum constituting spokes which are united at the center by a hub —10—.

This hub is provided with a central opening for receiving the adjacent end of a horizontally extending shaft —11— having its other end riveted or otherwise secured to the center of the back plate —1— as shown in Figure 2 to hold the shaft in fixed relation to the frame.

A pulley or sheave —12— is journaled upon the rear end of the shaft —11— and is provided with a peripheral groove for receiving the intermediate portion of a cable —13—, the ends of which are brought toward each other below the pulley and are passed through guide openings —14— in a guide block —15— which is riveted or otherwise secured to the back plate —1— directly below the vertical center of the pulley —12— for guiding the cable as it is moved endwise in reverse directions by the weight of the person or other object supported by either end of the cable.

Diametrically opposite sides of the inner flange of the groove pulley —12— are extended radially in opposite directions for receiving and supporting a pair of bearing studs —16— which are riveted or otherwise secured thereto to project inwardly therefrom parallel with the shaft —11— to form journal bearings for a pair of diametrically opposite planetary gears —17— in equally spaced relation from the axis of the shaft —11—.

The inner side of the pulley —12— together with the studs —16— constitute a rotary carrier for the gears —17— for moving them bodily about the axis of the shaft —11— in intermeshing engagement with the internal gear ring —2— which is of relatively larger diameter than the gears —17— for imparting to said gears a relatively high speed of rotation about the axes of their respective journal bearings —16— during their planetary movement about the shaft —11—.

Rotary motion is transmitted from the gears —17— to a relatively smaller pinion —18— which is journaled on the shaft —11— adjacent the inner end of the hub of the pulley —12— thereby imparting a relatively higher speed of rotation to said pinion.

A split brake ring —19— is rotatably mounted within the peripheral flange of the brake drum —3— and is provided with a peripheral lining —20— of leather, fibre or other suitable material for frictionally engaging the inner face of the drum when expanded during its rotation by means hereinafter explained.

Suitable means is provided for transmitting rotary motion from the high speed pinion —18— to the brake ring —19— and for this purpose one side of the brake ring is provided with circumferentially spaced inwardly projecting shoulders —21—, Figure 3, adapted to be engaged by the interposed end of a plate —22— having its central portion riveted or otherwise secured to the inner end of the pinion —18— to rotate therewith, said plate having its opposite ends offset axially beyond the inner end of the pinion —18— for imparting rotary motion to a weighted centrifugally operated member —24— in a manner presently described.

That is, the plate —22— extends radially in opposite directions from the inner end of its supporting pinion —18—, one end thereof being engaged with and between the shoulders —21— while the other end is offset parallel with the axis of the shaft —11— to form a ledge —25— which, together with the opposite arm of the same plate extends through and engages the opposite walls of a lengthwise slot —26— in the weighted member —24— for transmitting rotary motion from the pinion —18— to the weighted member and at the same time form guides for the radial movement of said member.

This weighted member —24— consists of a substantially flat plate of suitable metal interposed between the inner end of the pinion —18— and adjacent inner face of the brake ring —19— and extends around the shaft —1— to diametrically opposite sides thereof so that the shaft —11— may extend through the slot —26— therein, one end of said weighted member being considerably heavier than the opposite end to cause it to move radially by centrifugal force when rotated by the opposite arms of the plate —22—.

The portions of the opposite arms of the plate —22— in front of the weighted member —24— are slightly widened to extend partially across the adjacent face of said weighted member for cooperation with the front end of the pinion —18— in holding the weighted member —24— against axial movement while at the same time permitting its free radial movement.

A comparatively light spring —27— is attached at one end to a pin —28— on the weighted member —24— at one side of the slot —26— and has its other end engaged with another pin —29— on the weighted member at the opposite side of said slot, the intermediate portion of said spring being slightly arched toward and against the inner face of the ledge —25— on the pinion —18— for retracting the weighted member when the rotating parts are at rest after it has been thrown outwardly and radially by centrifugal force during the rotation of those parts.

It will be observed that the retracting spring —27— is engaged only with the rotating parts or those parts which rotate at the same speed thereby avoiding friction between the spring and any fixed part of the device, all of which contributes to the free operation of the rotating parts and also the radial movement of the weighted member by centrifugal force.

Suitable means is provided converting this radial movement of the weighted member —24— by centrifugal force into an expansive force acting upon the split brake ring —19— at opposite sides of its split or division —30— which is diametrically opposite the shoulders —21— of said ring, said means consisting, in this instance, of a pair of thrust members —31— having their outer ends provided with hooks —32— which are detachably engaged in apertures —33— in the inner flange as —34— of the brake ring —19— equal distances from and at opposite sides of the division —30—, said thrust members being extended inwardly in converging planes from their outer ends so as to meet in a plane passing through the axis of the shaft —11— and division —30—, the inner ends of said thrust members being engaged with a bearing member —35— on the front face of the weighted member —24— as shown more clearly in Figures 2 and 3.

The inner ends of the thrust members —31— are bent outwardly in slightly diverging planes and abut against each other to constitute what may be termed a toggle connection between the weighted member —24— and brake ring —19— whereby as the weighted member —24— is moved outwardly and radially by centrifugal force its action upon the thrust members —31— will expand the brake ring —19— against the inner face of the brake drum —3— for preventing excessive speed of rotation of the cable driven parts and thereby preventing excessive endwise movement of the cable when weighted by a person or other object attached to one end thereof.

The object in providing the thrust member —21— with hook connections as —32— with the brake ring —19— is to assure free movement of those connections during the centrifugal throw of the weighted member —24— and return and at the same time to reduce the number of parts to a minimum and thereby to facilitate the assembling of those parts.

The ends of the cable —13— are usually provided with loops as —36— adapted to be passed around the body and under the arms of the user when descending by means of the fire escape and inasmuch as the safety of the person depends largely on the safety of the loop suitable means is provided for assuring a more reliable connection between each loop and the end of the cable.

For this purpose is provided a pair of yoke members —37—, one for each end of the cable and each consisting of a cup-shaped head —38— having an opening —39— therethrough in the apex thereof through which the end of the cable is passed and then tied into a suitable knot —40— for entrance wholly or in part into the concave portion of the head —38—.

Each yoke member —37— is substantially U-shaped in that it is provided with opposite arms extending downwardly from opposite sides of the head —38— and preferably integral therewith, the lower ends of the arms being connected by a cross rod —41— riveted or otherwise secured thereto and around which the adjacent ends of the loop —36— are passed and fastened together by rivets —42—.

Each loop is embraced by a more or less flat ring —43— entirely surrounding the same and movable endwise thereon to assist in tightening the loop around the body.

*Operation.*

Assuming that the back plate —1— is securely fastened by the screws —7— to a suitable supporting surface within the upper room of a building and that the ends of the cable —13— are coiled or otherwise supported in said room, then in case of fire or other necessity for hasty exit from the room the longer end of the cable would be thrown out of the window to allow its loop to drop into proximity to a safe landing whereupon the occupant of the room would slip the other loop around his body and under the arms and jump or drop from the window.

Under these conditions the weight of the body upon the occupied loop would cause that end of the cable to be drawn downwardly at a safe speed as regulated by the centrifugal action of the weighted member —24— upon the thrust members —31— and through said thrust members upon the split brake ring —19— which would be then expanded against the inner periphery of the brake drum —3— to retard the speed of descent of the occupant of the lowering loop until said occupant reached a safe landing.

During this downward movement of the occupied loop the other end of the cable with the loop thereon would be drawn upwardly ready for a repetition of the operation previously described.

It is evident however, that either end of the loop may be used for conveying other persons from lower stories of the building, if desired.

As the weighted member —24— is thrown radially by centrifugal force the light spring —27— is placed under more or less tension and is always in engagement with parts which rotate at the same rate of speed thus permitting free rotation of those parts and also free radial movement of the weighted member, said spring being of just sufficient tension to return the weighted member to its normal position when the rotation of the brake ring ceases or when unequal weights or no weight is attached to the ends of the cable.

A sleeve —18'— is placed upon the front end of the shaft —11— between the front end of the hub —18— and front end of the brake drum —3— to hold said hub and parts carried thereby against forward axial displacement and thereby to prevent contact of the weighted member —24— with the adjacent end of the brake drum —3— which otherwise might retard the free rotation of the weighted member by frictional contact with the relatively stationary brake drum.

What I claim is:—

1. In a fire escape of the character described, a non-rotatable brake drum, a self retracting and expansible brake band rotatable within the brake drum, a weighted member rotatable about the axis of the brake band and having an independent radial sliding movement by centrifugal force, means including a rotary plate for rotating the weighted member and brake band, and a flat spring carried by the weighted member and engaged with said plate for retracting the weighted member.

2. In a fire escape of the character described, a non-rotatable brake drum and a self retracting and expansible brake band rotatable within the drum and divided transversely through one side, a weighted member rotatable about the axis of the brake band and having independent radial sliding movement by centrifugal force, means for rotating the weighted member and brake band, a bearing member on the weighted member between said axis and the divided portion of the brake rim, and thrust members pivotally connected to the brake band at opposite sides of the division and extending toward each other and being engaged with the bearing member for expanding the brake band as the weighted member is moved radially by centrifugal force.

3. In a fire escape of the character described, a non-rotatable brake drum, a self retracting and expansible brake band rotatable within the brake drum, a weighted member rotatable about the axis of the brake band and having an independent radial sliding movement by centrifugal force, means including a rotary plate for rotating the weighted member and brake band, a flat spring carried by the weighted member and engaged with said plate for retracting the weighted member, a bearing member on the weighted member between said axis and divided portion of the brake band, and thrust members pivotally connected to the brake band at opposite sides of the division and extending towards each other and being engaged with the bearing member for expanding the brake band as the weighted member is moved radially by centrifugal force.

4. In a fire escape of the character described, a non-rotatable brake drum, a self retracting and expansible brake band rotatable within the brake drum, a weighted member rotatable about the axis of the brake band and having an independent radial sliding movement by centrifugal force, means including a rotary plate for rotating the weighted member and brake band, a flat spring carried by the weighted member, a bearing member on the weighted member between said axis and divided portion of the brake band, and thrust members pivotally connected to the brake band at opposite sides of the division and extending towards each other and being engaged with the bearing member for expanding the brake band as the weighted member is moved radially by centrifugal force, the point of engagement between the spring and the plate being in the same radial line as the point of engagement between the thrust member and the bearing member.

In witness whereof I have hereunto set my hand this 3d day of January, 1927.

CHARLES F. DAVY.